US006487760B1

(12) United States Patent
Larsen

(10) Patent No.: US 6,487,760 B1
(45) Date of Patent: Dec. 3, 2002

(54) ELASTIC LOOP-TYPE HOOK FASTENING DEVICE

(76) Inventor: Walter Louis Larsen, P.O. Box 18302, Seattle, WA (US) 98118

( * ) Notice: Subject to any disclaimer, the term of this patent is extended or adjusted under 35 U.S.C. 154(b) by 0 days.

(21) Appl. No.: 08/432,237

(22) Filed: May 1, 1995

Related U.S. Application Data

(63) Continuation of application No. 07/691,686, filed on Apr. 25, 1991, now abandoned, which is a continuation of application No. 06/351,009, filed on Feb. 22, 1982, now abandoned, which is a continuation-in-part of application No. 06/028,850, filed on Apr. 10, 1979, now Pat. No. 4,575,906.

(51) Int. Cl.[7] ............................................... A41D 27/22
(52) U.S. Cl. ..................... 24/598.7; 24/598.4
(58) Field of Search ....................... 24/598.7, 600.9, 24/598.4, 716; 248/340; 223/85

(56) References Cited

U.S. PATENT DOCUMENTS

| 1,797,539 | A | * | 3/1931 | Arthur ........................ 206/805 |
|---|---|---|---|---|
| 2,651,134 | A | * | 9/1953 | Kemmerer .................. 43/43.2 |
| 2,877,941 | A | * | 3/1959 | Melone ........................ 223/88 |
| 3,184,204 | A | * | 5/1965 | Dachinger ................ 24/259 R |
| 4,008,835 | A | * | 2/1977 | Budzik ......................... 223/85 |
| 4,200,404 | A | * | 4/1980 | Agnew et al. ............. 24/588 X |
| 4,227,668 | A | * | 10/1980 | Ernst ......................... 24/16 PB |

FOREIGN PATENT DOCUMENTS

| CH | 463738 | * | 11/1968 | .................. 223/85 |
|---|---|---|---|---|
| FR | 796222 | * | 1/1936 | ................ 24/16 PB |
| FR | 1276833 | * | 10/1961 | ................ 24/16 PB |
| FR | 1281537 | * | 12/1961 | ................ 24/16 PB |
| FR | 1500741 | * | 9/1967 | .................. 223/85 |

* cited by examiner

Primary Examiner—James R. Brittain

(57) ABSTRACT

This invention pertains primarily to supplementary fastening devices utilizing a flexible and elastically elongatable loop for fastening the hook of a garment hanger or other hook including device to a clothesline or other linear member to which the hook is hooked.

37 Claims, 1 Drawing Sheet

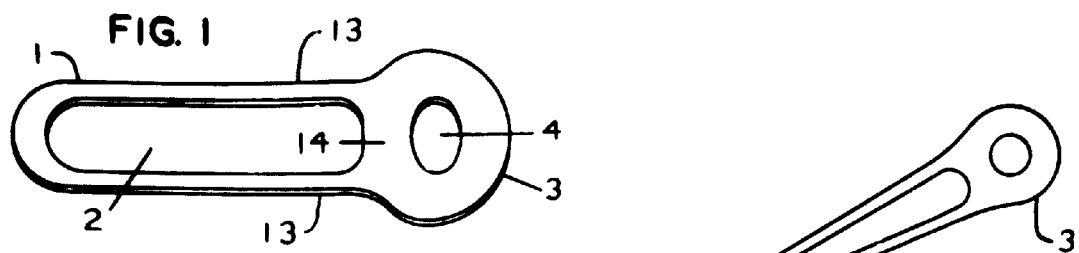
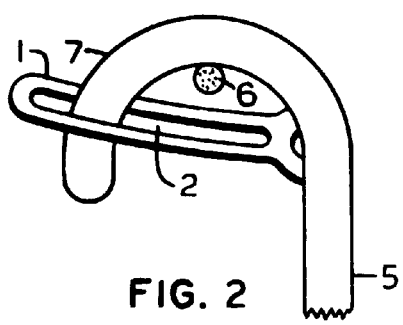
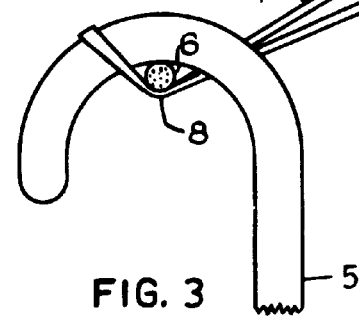
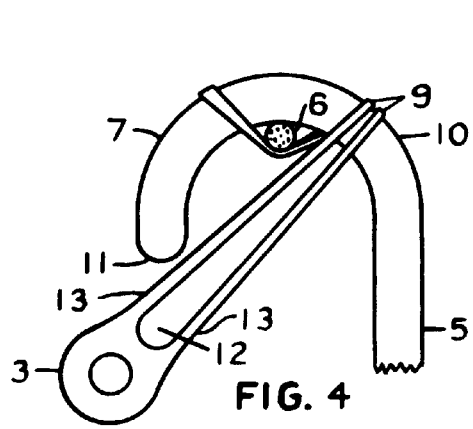
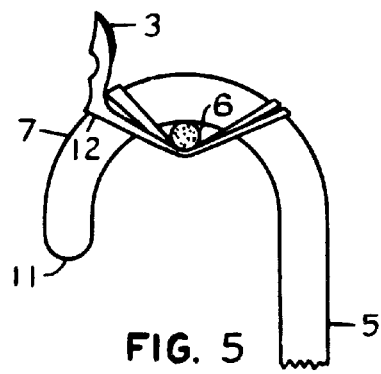
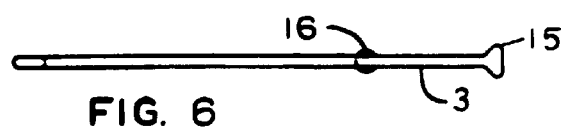
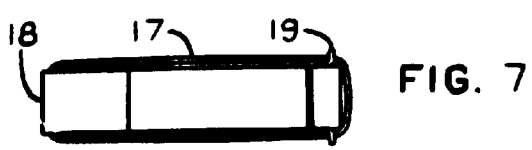
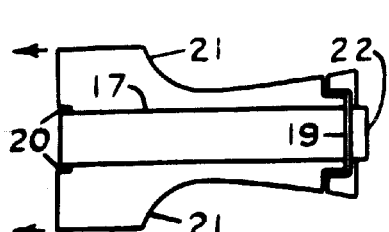
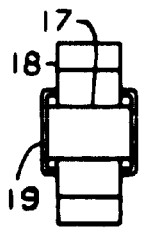
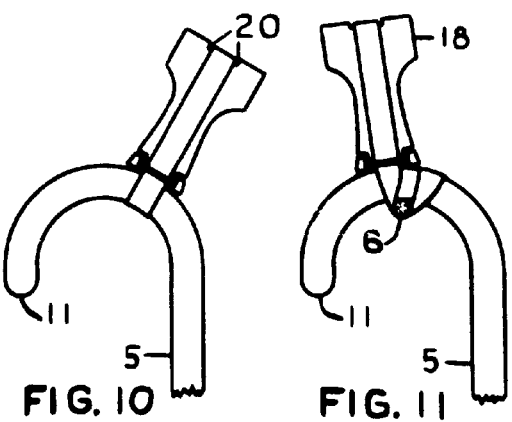
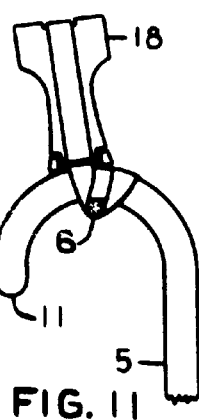

ELASTIC LOOP-TYPE HOOK FASTENING DEVICE

CROSS REFERENCE TO RELATED APPLICATIONS

This application is a continuation of application Ser. No. 07/691,686, filed Apr. 25, 1991, now abandoned, which is a continuation of application Ser. No. 06/351,009, filed Feb. 22, 1982, now abandoned; which, in turn, is a continuation-in-part of, and contains subject matter divided from, application Ser. No. 06/028,850, filed Apr. 10, 1979, now U.S. Pat. No. 4,575,906.

TECHNICAL FIELD

This invention relates to supplementary fastening devices in the form of a flexible and elastically elongatable loop for securing any typically shaped hook, such as an ordinary hook of a garment hanger, to a generally linear member such as a clothesline, cable, rod or the like to which the hook is attached by being hooked to the linear member. It also relates to devices for fastening an object to a generally linear member, such devices being comprised of the combination of a hook, to which the object is or can be attached, and a flexible and elastically elongatable loop-type fastening device. It further relates to methods for fastening a hook to a linear member using a loop-type fastening device, to a device and a method for providing for an increase in the stretchable length of the loop part of such a fastening device, and to methods for providing for the removal of a loop-type fastening device.

BACKGROUND ART

A bendable loop-type hook fastening device is set forth in French Patent No. 1.500.741 issued to Jacob. A semi-rigid loop-type clip adapted to close the hook opening of hooks having substantially parallel sections is set forth in U.S. Pat. No. 2,122,309 issued to Beimler. An elongatable link in the form of an elastic strip of material having two longitudinally spaced holes and adapted to close the opening of a hook in a manner similar to that shown in Biemler, is presented in U.S. Pat. No. 2,877,941 issued to Melone.

DISCLOSURE OF THE INVENTION

There has long been a need for a practical fastening device which could fasten the hook of an ordinary unmodified garment hanger or other hook including device to a clothesline or other comparatively thin generally linear member. In the case of garment hangers, they are commonly used for holding various items of clothing while they dry after being washed. When suspended from a clothesline, garment hangers are often blown by the wind along the clothesline with the result that several suspended garment hangers may bunch together and thereby retard the drying. In gusty winds, suspended garment hangers are often blown off the clothesline.

Some of the previous attempts to solve these problems have involved modifications to, or replacement of, the hook of the garment hanger. In some cases this has resulted in a device which was very limited in the range of diameters of supporting clotheslines which could be accomodated by the device. Nearly always, such devices resulted in higher product cost. Other attempts have involved devices which attach to the clothesline and then, in turn, suspend the garment hanger hook from the device itself. These devices appear to be costly and/or ineffectual at retaining the hook in suspension under adverse conditions. The bendable loop set forth in French Patent No. 1.500.741 is a separate fastening device which does fasten a hook to a clothesline. However, this device is quite limited in the range of hook and clothesline sizes which it can accomodate and is also limited in the amount of clamping force which it can exert on the hook and the clothesline. A loop such as set forth in U.S. Pat. No. 2,122,309 is essentially a device for closing the opening of a hook and it generally does not exert any clamping force between the hook and its support, particularly when that support is a comparatively small diameter linear member such as a clothesline. The elastically elongatable link having two longitudinally spaced holes for accomodating the shank and end portions of a garment hanger hook, presented in U.S. Pat. No. 2,877,941, is likewise a hook-closing device and it also does not exert any clamping force when the hook is supported from a linear member of the comparative size of a clothesline.

To alleviate problems such as the foregoing, this invention provides a simple and inexpensive to manufacture supplementary fastening device for securing the hook of an ordinary unmodified garment hanger or other hook including device to a clothesline or other linear member, particularly a comparatively thin linear member, to which the hook has been hooked in the normal manner. This is accomplished by means of a flexible and elastically elongatable loop which is installed on the hook and the linear member so as to bind them together to prevent disengagement of the hook from the linear member and to resist slippage of the hook along the linear member. The loop is generally provided with a handle or other structure which greatly improves the manipulatability of the fastening device, particularly in removing the fastening device from its fastening position, and which may also take up some of the slack in the loop. Methods are presented for installing the fastening device and methods are also presented for providing for its removal.

It is therefore an object of the present invention to provide a supplementary fastening device for fastening any typically shaped hook such as the hook of a garment hanger or other hook or generally curved member including device to a clothesline or other generally linear member to which the hook is attached by being hooked to the linear member.

It is also an object of this invention to provide a fastening device, for securing any typically shaped hook or generally curved member to a generally linear member, which is inexpensive to manufacture and easy to use, which will tend to prevent a hook, which is hooked to a linear member, from being unintentionally unhooked from the linear member, and/or which will tend to prevent a hook, which is hooked to a linear member, from being displaced along the direction of the linear member.

Another object of this invention is to provide a connecting device comprised of the combination of a hook and an elastically elongatable loop-type fastening device, for generally fastening an object to a linear member.

A further object of this invention is to provide methods for securing a hook to a linear member, for fastening an object to a linear member through the use of a hook and an elastically elongatable loop-type fastening device, for providing for an increase in the stretchable length of the loop portion of a loop-type fastening device, and for providing for expeditious and convenient removal of a loop-type fastening device from its fastening position.

Other objects and advantages will become apparent and a fuller understanding of the invention may be had by referring to the detailed description hereinafter presented, taken

DESCRIPTION OF THE DRAWINGS

FIG. 1 is a modified perspective view of a flexible and elastically elongatable loop-type fastening device as made generally from stretchable sheet material.

FIG. 2 is a side elevational view of a garment hanger hook which is hooked to a clothesline and a loop-type fastening device in an initial position of installation.

FIG. 3 is a side elevational view of the hook hooked to the clothesline a in FIG. 2 with the loop-type fastening device in an intermediate position of installation.

FIG. 4 is a side elevational view of the hook hooked to the clothesline as in FIG. 2 with the loop-type fastening device in a final intermediate position of installation.

FIG. 5 is a side elevational view of the hook hooked to the clothesline as in FIG. 2 with the loop-type fastening device in its fastening position on the hook and the clothesline. The labeled representation "A" stands for the body part of a garment hanger or, alternatively, means for attaching an object to the hook.

FIG. 6 is a side elevational view of a flexible and elastically elongatable loop-type fastening device as made generally by molding it of stretchable material.

FIG. 7 is a plan view of a flexible and elastically elongatable loop-type fastening device having a structure on which at least part of the loop is mounted.

FIG. 8 is a side elevational view of the device shown in FIG. 7.

FIG. 9 is an end view of the device shown in FIGS. 7 and 8.

FIG. 10 is a side view of the device shown in FIG. 8 installed on the hook of a garment hanger.

FIG. 11 is a side view of the device shown in FIGS. 8 and 10 fastening the hook of a garment hanger to a clothesline.

DESCRIPTION OF THE INVENTION

This invention is primarily a device in the form of a flexible and elastically elongatable effectively closed loop adapted to fasten any typically shaped hook such as the hook of a garment hanger or other hook including device to a clothesline or other comparatively thin linear member to which the hook is attached by being hooked to the linear member in the normal manner.

FIG. 1 shows one embodiment of this stretchable loop-type fastening device. This device, 1, can be made from any of a variety of flexible and elastic materials such as rubber, synthetic rubber, and some of the stretchable rubber-like plastics. It is also possible to make an elastic loop-type fastening device from a coil or other type of spring which can be stretched in length. The loop, 1, is made of such size, shape, and configuration, considering the elastic properties of the material used in its construction, that it can be flexed and stretched sufficiently in length to allow its being installed on the hook as shown and described herein without exceeding the normal useful elastic deformation capability of the loop material. The loop is also constructed so that it will contract sufficiently in length at the end of the installation procedure to grasp the hook and accomplish its fastening function. A handle, 3, can be connected to one section of the loop, 1, generally at one end of the loop, which will make it easier to stretch and manipulate the loop, particularly when removing the device from its fastening position, than would be the case without the handle.

FIGS. 2 through 5 show a convenient and effective method for installing the fastening device on a garment hanger hook, 5, which is hooked to a clothesline, 6, in the normal manner. First the loop, 1, is positioned so that the hook, 5, passes once through the opening, 2, of the loop, 1, as shown in FIG. 2. In this case the hook passes through the loop at a location, 7, on the hook which is outboard of the position occupied by the clothesline, 6. The outboard section, 7, of the hook, 5, is that section of the hook which extends from the position occupied by the clothesline, 6, to the end, 11, of the hook. Then, essentially by pulling on one section of the loop to stretch it and also moving that section of the loop, the loop is manipulated as shown in FIG. 3 so that the two strips of loop material, which extend from the above mentioned location where the hook passes through the loop, are caused to extend under the clothesline, 6, (at 8) and then to one side of the hook at a location, 10, on the hook which is inboard of the position occupied by the clothesline. This inboard location on the hook is on that portion of the hook which is on the other side of the position occupied by the clothesline from the outboard section of the hook. In the example of FIGS. 2 through 5, the loop, 1, has a handle, 3, connected to the loop at that section of the loop which is pulled and moved, as described above, in order to facilitate manipulation of that section of the loop. During installation of the loop on the hook and the clothesline, the hook is generally held in its position on the clothesline. It may be held in this position by the person installing the loop fastening device on it or it may be held in this position by gravity acting on a weight attached to the hook, by the inertia of the mass attached to the hook or by any other internal or externally applied force. After achieving the situation shown in FIG. 3, the same section of the loop that was pulled and moved previously is further moved around the outside of and around the other side of the hook (at 9) and down under the clothesline, 6, toward the outboard section, 7, of the hook as shown in FIG. 4. Then that same section of the loop is further moved so that the loop passes on the end, 11, of the hook, 5, with the end of the hook passing through the end, 12, of the loop opening and, finally, that section of the loop is raised and released on the outboard section, 7, of the hook as shown in FIG. 5.

The handle, 3, in addition to facilitating installation of the fastening device, greatly improves the ease with which the fastening device can be released from its fastening position for two reasons. First, the handle, 3, presents a readily grippable appendage to a device which would, without the handle, be quite difficult to grasp when tightly bound to the hook, 5, in its fastening position as shown in FIG. 5. Second, the handle conveniently and positively identifies the end of the loop, 12, that was last placed on the hook during installation of the fastening device. This is very important because it is this end of the loop which must be removed first from the hook during the removal process in order to release the loop from its fastening position without entangling the loop in the hook and the clothesline and thereby seriously impeding removal.

It is to be understood that when a garment hanger hook is being referred to herein, it is the hook of a complete garment hanger, including the body part, represented in part by the labeled representation "A" in FIG. 5, which is the remaining part of the hanger and which is for supporting garments placed on the hanger. It is also to be understood that the hook of any other hook including device may be substituted for the hook of a garment hanger; and that such other hook is included in the subject matter herein. The labeled representation "A" in FIG. 5 alternatively stands for means for attaching an object to the hook.

In the fastening arrangements shown in FIGS. 3–5 and FIG. 11, the hook is hooked to a linear member which is comparatively thin with respect to the size of the hook, and this is exemplified by depicting a garment hanger hook which is hooked to a clothesline. These drawings also show that the loop, when installed, occupies a position with respect to the hook and the linear member such that the hook passes through the loop at locations on the hook where the curved outer surface of the hook is substantially inwardly inclined away from the vertical (with reference to the situation in which the hook hangs downward normally by gravity from the linear member with the linear member generally being centrally located in the hook) as seen in a profile view of the hook as, for example, at 9 in FIG. 4. In other words, a line which is tangent to the outer surface of the hook at a location where the loop wraps around such outer surface (i.e. at 9 in FIG. 4) slants in an inward and upward direction with respect to the hook. This is the meaning of the term "substantially inwardly inclined" as used herein to describe the location where the hook passes through the loop or the loop wraps around the hook. The significance of such placement of the loop on the hook is that this causes the contracting forces in the stretched loop to urge each section of the loop that is wrapped around these inwardly-inclined outer surfaces of the hook in an upward and inward direction along these inclined hook surfaces. This, in turn, produces an upward component in the tension forces in the loop which causes the linear member to be forcefully pulled in and clamped against the inner surface of the hook. It also causes the loop to be locked in its position on the hook so that forces, such as those resulting from a wind causing relative movement between the hook and the linear member, will not cause the loop to loosen its grasp on the hook and the linear member as might be possible if only frictional forces were available to retain the loop in its position on the hook. This positive type of clamping and locking action is generally operable only with a linear member, such as a clothesline, which is comparatively thin with respect to the size of the hook. If a comparatively large diameter rod, such as a typical closet hanger rod, was used to support the hook, the size of the rod would, in many cases, push the loop so far away from the upper surface of the hook that the loop could not feasibly be wrapped around such upper hook surfaces to take advantage of such positive clamping and locking action. In some cases, depending on the shape of the hook, the loop might be placed so low on the hook that only friction (which might be overcome by wind or other forces) would be available to hold the loop in its position on the hook. The term "comparatively thin", as used herein, refers to the comparative diameter or thickness of the linear member and it means that the hook is of such size and shape with respect to the diameter or thickness of the linear member to which it is being fastened that the diameter or thickness of the linear member does not exceed that which will allow the loop-type fastening device to be installed in a position which will effectively produce the above described positive clamping and locking action resulting from the loop being installed on the substantially inwardly inclined outer surfaces of the hook as set forth above.

The embodiment of the fastening device shown in FIG. 1 is readily adapted to being manufactured by being cut from stretchable, generally rubber-like, sheet material. When the fastening device is cut from sheet material, the grippability of the handle by the fingers can very conveniently be increased by having the handle, 3, provided with a cut-out section, 4, as shown in FIG. 1. This additional cut-out can be provided during the same cutting operation used to manufacture the fastening device and thereby furnished with minimal increase in manufacturing cost. The fastening device can also be manufactured by being molded together with its handle as a one-piece unit of stretchable, generally rubber-like, material. When made in this manner, the grippability of the handle by the fingers can conveniently be increased by providing the handle, 3, with a raised portion, 15, as shown in side view in FIG. 6.

Installation of this fastening device will be facilitated, particularly when used with garment hangers which have thick hooks, such as those made of plastic, if the device is so constructed and shaped that the two strips of loop material which extend from the handle are held in a spaced-apart relationship. This will make it easier to install the handle end of the loop on the end of the hook during the final phase of installation. The fastening device shown in FIG. 1 accomplishes the spacing of these parts of the loop by having these two strips of loop material, 13, joined to the handle, 3, at suitably spaced-apart locations. Additionally, the section, 14, of the handle, 3, spanning between the locations where these two strips of loop material, 13, are joined to the handle, 3, has a greater cross sectional area than that of each strip to lessen the distortion tending to reduce the spacing between these two strips when stretching tension is placed on the loop during installation. These same methods can be used when the fastening device is produced by a molding process. In addition, when produced by molding, the handle end of the loop can be provided with a thickened or raised section, 16, in the vicinity of the location where these two strips of loop material are joined to the handle as shown in FIG. 6. This will provide additional structural material and cross sectional area to hold these two strips of loop material sufficiently far apart when the loop is stretched.

The stretchable loop-type fastening device can be provided with a loop lengthening structure on which at least part of the loop is mounted and which takes up at least part of the slack of the loop as shown in FIGS. 7 through 11. In this embodiment, the stretchable loop, 17, is mounted on such a structure which also serves as a handle, 18, and which takes up some of the slack in the loop. By taking up some of the slack in this manner, this device allows the stretchable length of the loop to be longer than would be required for fastening a hook to a clothesline without such structure which results in an increase in the effective elastic extensibility of the loop. This allows the fastening device to accomodate a greater range of hook and clothesline sizes and the increased elastic extensibility facilitates installation while providing better elastic clamping action on the hook and the clothesline.

In this embodiment, the loop, 17, is retained on the loop lengthening structure and handle, 18, by an enclosing ring, 19, which forms an aperture through which the loop extends in lateral confinement at one end of the structure and by a notch, 20, which forms a support for the loop at the other end of the structure. This structure and handle is shaped so that it provides finger grasps, 21, to aid in manipulation of the device, particularly in pulling it in the direction indicated by the arrows in FIG. 8 to stretch the loop, 17, during installation and removal of the fastening device.

In use, the end of the loop which is in the support or notch, 20, can be dismounted from the support by slipping it out of the notch and off to one side of the handle. Then the other end of the loop, 22, can be pulled out to draw a portion of the loop through the enclosing ring or aperture, 19, thereby creating an enlarged loop of slack material at that end of the handle. This enlarged portion of slack loop material can then be placed around the neck of a hanger hook, 5, by first passing the end, 11, of the hanger hook through the loop. Then the other end of the loop can be pulled back and replaced in the support or notch, 20, with the result that the fastening device loop will be positioned on the hanger hook, 5, as shown in FIG. 10. Generally the loop is positioned at a location on the hook which is inboard of the position occupied by the clothesline when the hook is hooked to the clothesline. Then, after the hanger hook has been suspended from a clothesline, 6, in FIG. 11, the handle, 18, is pulled down and under the clothesline and moved so that the end, 11, of the hanger hook passes through the stretched out loop opening near that end of the handle structure at which the enclosing ring or aperture, 19, is located. It can be seen in FIG. 7 that the end of the handle structure in the vicinity of the enclosing ring, 19, is of such width that it holds the two strips of loop material extending therefrom, when the loop is stretched out, in a spaced-apart relationship which facilitates passing the end, 11, of the hanger hook through the loop opening during this phase of installation. Then, to complete the fastening procedure, the handle, 18, is raised and released on the outboard section of the hook so that the fastening device assumes a position as shown in FIG. 11.

In addition to fastening a garment hanger hook to a clothesline, as in the examples herein, the loop-type fastening device can be combined with a hook to comprise a connecting device capable of connecting an object, other than a garment hanger, to a linear member. Such a connecting device functions in a manner somewhat analogous to the functioning of an ordinary snap hook. To accomplish this, the object can be temporarily or permanently attached to a hook, generally to the non hooked or shank portion of the hook, by appropriate means. Examples of such attaching means are bolting, tying, welding, fastening with a snap fastener, by being manufactured as part of the same piece of material as the hook (as in the case of some garment hangers), etc. The exact means by which the object is attached to the hook is not pertinent to the inventive concept presented herein and any appropriate means for attaching the object to the hook, represented alternatively by the labeled representation "A" in FIG. 5, is intended to be included within the scope of the claims presented herein. Also, the term "object", as used in the claims, includes a garment hanger as well as any other object which may be connected to a linear member. With the object attached to the hook, the hook can, in turn, be hooked to a linear member and fastened to it by means of a loop-type fastening device as described herein to complete the connecting of the object to the linear member.

The foregoing is considered as illustrative only of the principles of the invention. Further, since numerous modifications and changes will readily occur to those skilled in the art, it is not intended to limit the invention to the exact construction and operation described, and accordingly all suitable modifications and equivalents may be resorted to, falling within the scope of the invention as claimed.

What is claimed is:

1. The combination of a hook, which is part of and which comprises suspension means for a garment hanger, and a flexible and elastically elongatable effectively closed loop, wherein the hook and the loop are assembled and arranged in a hereinafter described relative position with respect to each other to fasten the hook to a linear member with the hook being hooked to the linear member in the normal manner, wherein the assembled and arranged relative position of the hook and the loop with respect to each other is that in which, with the hook hooked to the linear member, the hook passes through one end of the loop opening at a first substantially inwardly inclined location on the hook which is outboard of the position occupied by the linear member and the loop substantially and effectively lies on a path which extends from said first outboard location where the hook passes through the loop opening to a location under the position occupied by the linear member, thence to a second substantially inwardly inclined location on the hook which is inboard of the position occupied by the linear member with both strips of loop material, which extend from said first inwardly inclined outboard location on the hook, passing to one side of and over and around the outside of and around to the other side of the hook at said second inwardly inclined inboard location on the hook, thence under the position occupied by the linear member again and the hook passes through the other end of the loop opening at a generally inwardly inclined location on the hook which is outboard of the position occupied by the linear member, generally near to the first said inwardly inclined location where the hook passes through the loop opening, wherein the hook is of such size and shape with respect to the diameter or thickness of the linear member to which it is being fastened that the linear member is comparatively thin with respect to the size and shape of the hook to such degree that the loop can be installed on the hook at substantially inwardly inclined locations on the hook which are outboard and inboard, respectively, of the position occupied by the linear member, wherein the size, the flexibility, and the range of effective and useful elastic extensibility and contractibility of the loop is such as to permit installation of the loop to such position and also to confiningly grasp the hook and the linear member in such position within such range, and wherein the loop is so constructed that it functions to permit its installation to such position and to confiningly grasp the hook and the linear member in such position primarily by the elastic extension and contraction of the loop.

2. The combination of a hook, which is part of and which comprises suspension means for a garment hanger, and a flexible and elastically elongatable effectively closed loop, wherein the hook and the loop are assembled and arranged in a hereinafter described relative position with respect to each other to fasten the hook to a linear member with the hook being hooked to the linear member in the normal manner, wherein the assembled and arranged relative position of the hook and the loop with respect to each other is that in which, with the hook hooked to the linear member, the hook passes through one end of the loop opening at a first substantially inwardly inclined location on the hook which is on one side of the position occupied by the linear member, the loop extends therefrom to a location underneath the position occupied by the linear member, and the hook passes through the other end of the loop opening at a second substantially inwardly inclined location on the hook which is on the other side of the position occupied by the linear member, wherein the hook is of such size and shape with respect to the diameter or thickness of the linear member to which it is being fastened that the linear member is comparatively thin with respect to the size and shape of the hook to such degree that the loop can be installed on the hook at substantially inwardly inclined locations on the hook which are on each side of the position occupied by the linear member, wherein the size, the flexibility and the range of effective and useful elastic extensibility and contractibility of the loop is such as to permit installation of the loop to such position and also to confiningly grasp the hook and the linear member in such position within such range, and wherein the loop is so constructed that it functions to permit its installation to such position and to confiningly grasp the hook and the linear member in such position primarily by the elastic extension and contraction of the loop.

3. The combination of claim 2 further comprising a handle which is connected to one section, designated the handle section, of the loop for stretching and moving said handle section of the loop during installation and removal of the loop in and from its assembled position with respect to the hook and the linear member.

4. The combination of claim 1 further comprising a handle which is connected to one section, designated the handle sections of the loop for stretching and moving said handle section of the loop during installation and removal of the loop in and from its assembled position with respect to the hook and the linear member.

5. A fastening device for fastening a hook to a generally linear member when the hook is hooked to the linear member in the normal manner, said fastening device comprising the combination of a flexible and elastically elongatable effectively closed loop and a loop lengthening structure on which at least a portion of the loop is mounted so as to provide means for increasing the stretchable length of the loop without the necessity for increasing the effective relaxed size of the opening of the loop for fastening purposes, wherein the fastening device has means for laterally confining the loop at the approximate location where the loop extends from the loop lengthening structure while allowing substantially unrestricted linear elastic extension of the loop from the loop lengthening structure whereby a longer loop can be utilized in the device than would be suitable without such loop lengthening structure and thereby the effective elastic extensibility of the loop can be increased.

6. The loop combined with the loop lengthening structure of claim 5 further comprising means for providing increased slack in the loop and for withdrawing such increased slack.

7. A connecting device for connecting an object to a generally linear member, said device comprising the combination of a hook and the fastening device of claim 5 as assembled and arranged in a hereinafter described relative position with respect to each other to fasten the hook to the linear member, wherein there is means for attaching the object, at least indirectly and at least temporarily, to the hook, generally to the non hooked or shank portion of the hook, wherein the assembled and arranged relative position of the hook and the fastening device with respect to each other is one in which, with the hook hooked to the linear member in the normal manner, the hook passes through that portion of the loop which extends from the loop lengthening structure at a first substantially inwardly inclined location on the hook which is on one side of the position occupied by the linear member and the strip of material of which said portion of the loop is made and comprised substantially and effectively lies on a path which extends from said location where the hook passes through said portion of the loop to a location under the position occupied by the linear member, thence to one side of and over and around the outside of and around to the other side of the hook at a second substantially inwardly inclined location on the hook which is on the other side of the position occupied by the linear member, thence under the position occupied by the linear member again and, finally, rejoined on the hook on the first mentioned side of the position occupied by the linear member, wherein the hook is of such size and shape with respect to the diameter or thickness of the linear member to which it is being fastened that the linear member is comparatively thin with respect to the size and shape of the hook to such degree that the loop can be installed on the hook at substantially inwardly inclined locations on the hook which are on each side of the position occupied by the linear member, wherein the size, the flexibility, and the range of effective and useful elastic extensibility and contractibility of the loop, as mounted on the loop lengthening structure, is such as to permit installation of the loop to such position and also to confiningly grasp the hook and the linear member in such position within such range, and wherein the loop is so constructed that it functions to permit its installation to such position and to confiningly grasp the hook and the linear member in such position primarily by the elastic extension and contraction of the loop, whereby, with the object attached to the hook and the hook fastened to the linear member by the fastening device, the object is connected to the linear member by the connecting device.

8. The connecting device of claim 7 wherein the loop lengthening structure includes an aperture through which the loop extends in lateral confinement away from said structure to form the open, hook-fastening, portion of the loop and wherein that part of the loop lengthening structure, which is on the opposite side of the aperture from said open portion of the loop, has a support for the end of the loop opposite to the open, hook-fastening, portion of the loop, said support being constructed so as to allow intentional dismounting of the loop from said support to provide temporary increased slack in the loop.

9. The connecting device of claim 7 wherein the loop lengthening structure is so constructed and combined with the loop that it forms a handle for manipulating the loop during installation and removal of the loop to and from its position of fastening the hook to the linear member.

10. A connecting device for connecting an object to a generally linear member, said device comprising the combination of a hook and a flexible and elastically elongatable effectively closed loop as assembled and arranged in a hereinafter described relative position with respect to each other to fasten the hook to the linear member with the hook being hooked to the linear member in the normal manner, wherein there is means for attaching the object, at least indirectly and at least temporarily, to the hook, generally to the non hooked or shank portion of the hook, wherein the assembled and arranged relative position of the hook and the loop with respect to each other is one in which, with the hook hooked to the linear member, the hook passes through the loop at a first substantially inwardly inclined location on the hook which is on one side of the position occupied by the linear member and the strip of material of which the loop is made and comprised substantially and effectively lies on a path which extends from said location where the hook passes through the loop to a location under the position occupied by the linear member, thence to one side of and over and around the outside of and around to the other side of the hook at a second substantially inwardly inclined location on the hook which is on the other side of the position occupied by the linear member, thence under the position occupied by the linear member again and, finally, rejoined on the hook on the first mentioned side of the position occupied by the linear member, wherein the hook is of such size and shape with respect to the diameter or thickness of the linear member to which it is being fastened that the linear member is comparatively thin with respect to the size and shape of the hook to such degree that the loop can be installed on the hook at substantially inwardly inclined locations on the hook which are on each side of the position occupied by the linear member, wherein the size, the flexibility, and the range of effective and useful elastic extensibility and contractibility of the loop is such as to permit installation of the loop to such position and also to confiningly grasp the hook and the linear member in such position within such range, and wherein the loop is so constructed that it functions to permit its installation to such position and to confiningly grasp the hook and the linear member in such position primarily by the elastic extension and contraction of the loop, whereby, with the object attached to the hook and the hook fastened to the linear member by the loop, the object is connected to the linear member by the connecting device.

11. The connecting device of claim 10 wherein the assembled and arranged relative position of the combination of the hook and the loop with respect to each other is that in which the hook passes through one end of the loop opening at the first said inwardly inclined location on the hook which is on one side of the position occupied by the linear member, the loop extends therefrom underneath the position occupied by the linear member and the hook passes through the other end of the loop opening at the second said inwardly inclined location on the hook which is on said other side of the position occupied by the linear member.

12. The device of claim 11 further comprising a handle which is connected to one section of the loop to serve as a manipulatable appendage for stretching and moving said section of the loop during installation and removal of the loop in and from its installed position with respect to the hook and the linear member.

13. The connecting device of claim 11 further comprising a handle which is connected to one section, designated the handle section, of the loop for stretching and moving said handle section of the loop during installation and removal of the loop in and from its assembled position with respect to the hook and the linear member, wherein the existence of a handle connected to one section of the loop effectively results in there being two strips of loop material which extend from said handle section of the loop and wherein the two strips of loop material which extend from said handle section of the loop are positioned in a spaced-apart relationship, said device further comprising means for maintaining an effective amount of spacing between said two strips of loop material to provide for facile installation of the loop on the end of the hook when stretching tension is placed on the loop.

14. A connecting device for connecting an object to a generally linear member, said device comprising the combination of a hook and a flexible and elastically elongatable effectively closed loop as assembled and arranged in a hereinafter described relative position with respect to each other to connect and retain the hook to the linear member with the hook being hooked to the linear member in the normal manner, wherein there is means for attaching the object, at least indirectly and at least temporarily, to the hook, generally to the non hooked or shank portion of the hook, wherein the assembled and arranged relative position of the hook and the loop with respect to each other is one in which, with the hook hooked to the linear member, the hook passes through one end of the loop opening at a first location on the hook which is outboard of the position occupied by the linear member, and the strip of material of which the loop is made and comprised substantially and effectively lies on a path which extends from said first outboard location on the hook, extending past a position occupied by the undersurface of the linear member, to a second location on the hook which is inboard of the position occupied by the linear member with both strips of loop material, which extend from said first outboard location on the hook, passing to one side of and over and around the outside of and around to the other side of the hook at said inboard location on the hook, thence the loop said path extends therefrom, extending past a position occupied by the undersurface of the linear member, to a location on the hook which is outboard of the position occupied by the linear member and so that the hook passes through the other end of the loop opening at that last mentioned outboard location on the hook, generally near to the first mentioned outboard location on the hook, wherein the size, the flexibility, and the range of effective and useful elastic extensibility and contractibility of the loop is such as to permit installation of the loop to such position and also to confiningly grasp the hook in such position, and wherein the loop is so constructed that it functions to permit such installation and to so grasp the hook primarily by the elastic extension and contraction of the loop, whereby, with the object attached to the hook and with the hook hooked to and retained to the linear member by the loop, the object is connected to the linear member by the connecting device.

15. The connecting device of claim 14 further comprising a handle which is connected to one section of the loop to serve as a manipulatable appendage for stretching and moving said section of the loop during installation and removal of the loop to and from its assembled position with respect to the hook.

16. The connecting device of claim 14 wherein, in the described assembled and arranged relative position of the hook and the loop with respect to each other, at least one of the two mentioned locations on the hook which are outboard of the position occupied by the linear member and at which the hook passes through an end of the loop opening is, additionally, at a substantially inwardly inclined location on the hook and the mentioned location on the hook which is inboard of the position occupied by the linear member and at which both strips of loop material pass around the outside of the hook is, additionally, at a substantially inwardly inclined location on the hook, wherein the hook is of such size and shape with respect to the diameter or thickness of the linear member to which it is being connected and retained that the linear member is comparatively thin with respect to the size and shape of the hook to such degree that the loop can be installed on the hook at substantially inwardly inclined locations on the hook which are outboard and inboard, respectively, of the position occupied by the linear member, wherein the size, the flexibility, and the range of effective and useful elastic extensibility and contractibility of the loop is such as to permit installation of the loop to such position and also to confiningly grasp the hook and the linear member in such position within such range, and wherein the loop is so constructed that it functions to permit its being installed to such position and to confiningly grasp the hook and the linear member in such position primarily by the elastic extension and contraction of the loop and thereby to positively and forcefully fasten the hook to the linear member, whereby, with the object attached to the hook and the hook fastened to the linear member by the loop, the object is connected to the linear member by the connecting device.

17. The device of claim 16 wherein the hook is the hook of a garment hanger, said device further comprising the body part of a garment hanger, said hook and said body part being parts of the same garment hanger, said body part being the remaining part of the garment hanger for which said hook comprises the usual suspension means, said body part of the garment hanger being the object which said device is generally capable of connecting to said linear member, said object thereby being combined with and made a part of said device.

18. The device of claim 16 further comprising a handle which is connected to one section of the loop to serve as a manipulatable appendage for stretching and moving said section of the loop during installation and removal of the loop in and from its installed position with respect to the hook and the linear member.

19. The connecting device of claim 18 wherein the existence of a handle connected to one section of the loop effectively results in there being two strips of loop material which extend from said section, designated the handle section, of the loop, wherein the two strips of loop material which extend from said handle section of the loop are positioned in a spaced-apart relationship, and wherein the loop has means for maintaining an effective amount of spacing between said two strips of loop material to provide for facile installation of the loop on the end of the hook when stretching tension is placed on the loop.

20. The device of claim 19 wherein said means for maintaining an effective amount of spacing between said two strips of loop material is provided by a section of material which is of the same continuous piece of material of which the loop is made and which spans between the locations where the two spaced-apart strips of loop material extend from said handle section of the loop, said section of material having a generally greater cross sectional area than that of each strip, thereby providing greater strength in said handle section of the loop to lessen distortion tending to reduce the spacing between said two strips of loop material when stretching tension is placed on the loop.

21. The device of claim 18 wherein the handle has a cut-out section for increasing the grippability of the handle by the fingers.

22. The device of claim 18 wherein the handle is made of the same continuous piece of material of which the loop is made.

23. A method for fastening a hook to a comparatively thin linear member comprising the steps of putting the hook on the linear member so that the hook is hooked to the linear member in the normal manner, positioning a flexible and elastically elongatable effectively closed loop on the hook such that the hook passes once through the loop at a first location on the hook at which the outer surface of the hook is substantially inwardly inclined and which is on one side of the position occupied by the linear member when the hook is hooked to the linear member and, after the preceding two steps have been accomplished in an appropriate order, essentially pulling one section of the loop to stretch the loop and also moving said section of the loop so as to install the loop in a fastening position with respect to the hook and the linear member such that the strip of material of which the loop is made and comprised substantially and effectively lies on a path which extends from said first substantially inwardly inclined location on the hook to a location under the linear member, thence around the outside of the hook at a second location on the hook at which the outer surface of the hook is substantially inwardly inclined and which is on the other side of the position occupied by the linear member, thence to a location under the linear member again and, finally, rejoined on the hook on the first mentioned side of the position occupied by the linear member, wherein the comparative relationship of the hook being fastened to a comparatively thin linear member means that the hook is of such size and shape with respect to the diameter or thickness of the linear member that the linear member is comparatively thin with respect to the size and shape of the hook to such degree that the loop is permitted to be installed on the hook at substantially inwardly inclined locations on the hook which are on each side of the position occupied by the linear member, whereby the method results in the hook being positively and forcefully fastened to the linear member by the loop.

24. A method according to claim 23 herein the step of positioning the loop on the hook with the hook passing once through the loop is accomplished by so positioning the loop at a substantially inwardly inclined location on the hook which is inboard of the position occupied by the linear member when the hook is hooked to the linear member and wherein the step of installing the loop in said fastening position with respect to the hook and the linear member is accomplished by extending the loop, from said inboard location on the hook, under the linear member and pulling and moving said pulled and moved section or the loop so that the loop stretches and extends from under the linear member toward that section of the hook which is located outboard of the position occupied by the linear member and, further, by moving said section of the loop so that the loop passes on the end of the hook with the end of the hook passing through the loop and, further, by releasing said section of the loop on a substantially inwardly inclined location on the outboard section of the hook.

25. A method according to claim 24 wherein the loop has a handle connected to it and wherein, in performing the method, the loop is stretched and said section of the loop is moved as set forth therein by pulling and moving the handle, the handle being connected to the loop at said pulled and moved section of the loop.

26. A method according to claim 23 wherein the step of positioning the loop on the hook such that the hook passes once through the loop is accomplished by so positioning the loop at a first substantially inwardly inclined location on the hook which is outboard of the position occupied by the linear member when the hook is hooked to the linear member in the normal manner, said first location on the hook being on the outboard section of the hook, and wherein the step of installing the loop in said fastening position with respect to the hook and the linear member is accomplished by extending the loop, from said outboard location on the hook, under the linear member and pulling and moving said pulled and moved section of the loop so that both strips of loop material, which extend from said first outboard location on the hook, extend from under the linear member to one side of the hook at a second substantially inwardly inclined location on the hook which is inboard of the position occupied by the linear member and, further, by moving said section of the loop around the outside of and around the other side of the hook and down under the linear member again toward the outboard section of the hook and, further, by moving said section of the loop so that the loop passes on the end of the hook with the end of the hook passing through the end of the loop and, finally, by releasing said section of the loop on the outboard section of the hook, generally at a substantially inwardly inclined location on the outboard section of the hook and generally near to said first substantially inwardly inclined location on the hook, whereby the strip of material of which the loop is made and comprised is rejoined on the hook on the first mentioned side of the position occupied by the linear member and the hook is positively and and forcefully fastened to the linear member by the loop.

27. A method according to claim 26 wherein the loop has a handle connected to it and wherein, in performing the method, the loop is stretched and said section of the loop is moved as set forth therein by pulling and moving the handle, the handle being connected to the loop at said pulled and moved section of the loop.

28. A method according to claim 27 wherein the step of putting the hook on the linear member so that the hook is hooked to the linear member in the normal manner is accomplished before the step of positioning a flexible and elastically elongatable effectively closed loop on the hook such that the hook passes once through the loop.

29. A method for providing for an improvement in the ease of removing a loop from the position of fastening a hook to a comparatively thin linear member which results from accomplishment of the method of claim 26, wherein such improvement is provided, at least in part, by providing for the avoidance of the entanglement of the loop in the hook and the linear member during such removal, said method in this claim comprising only the step of providing the loop with a graspable manipulatable appendage which is connected to the loop at said pulled and moved section of the loop, whereby said section of the loop will be positively identified and provided with ready removal means to avoid entanglement by ensuring that that section of the loop can be removed first from the end of the hook and to facilitate its removal from the end of the hook.

30. A method according to claim 23 wherein the effectively closed loop is combined with loop lengthening structure on which at least part of the loop is mounted and wherein the step of installing the loop in its fastening position with respect to the hook and the linear member is accomplished essentially by grasping, pulling, and moving said structure, using said structure as a handle to move said pulled and moved section of the loop.

31. A method according to claim 23 wherein the effectively closed loop is combined with loop lengthening structure on which at least part of the loop is mounted and which provides means for releasing a portion of the mounted part of the loop to increase the slack in the unmounted part of the loop and means for withdrawing such increased slack and wherein the step of positioning the loop on the hook such that the hook passes once through the loop is accomplished by releasing a portion of the loop to increase the slack in the loop, positioning the loop with its increased slack on the hook with the hook passing once through the loop and then withdrawing and removing the increased slack in the loop with the loop positioned on the hook.

32. A method for providing for an increase in the stretchable length of a loop which is used to fasten a hook to a linear member the method of claim 23, the method comprising the steps of providing a loop lengthening structure for the loop and of mounting at least part of the loop on the loop lengthening structure, whereby the effective elastic extensibility of the loop is increased.

33. A method for connecting and retaining a hook to a linear member comprising the steps of putting the hook on the linear member so that the hook is hooked to the linear member in the normal manner, positioning a flexible and elastically elongatable effectively closed loop on the hook such that the hook passes once through one end of the opening of the loop at a first location on the hook which is outboard of the position occupied by the linear member when the hook is hooked to the linear member and, after the preceding two steps have been accomplished in an appropriate order, essentially pulling one section of the loop to stretch the loop and also moving said section of the loop so that the loop is extended from said outboard location on the hook, past a position occupied by the undersurface of the linear member, to a second location on the hook which is inboard of the position occupied by the linear member with both strips of loop material passing to one side of the hook at that inboard location on the hook, thence moving said pulled and moved section of the loop so that both strips of loop material wrap around the outside of and around the other side of the hook at said inboard location on the hook and extend therefrom, past a position occupied by the undersurface of the linear member, toward the section of the hook which is outboard of the position occupied by the linear member, and further, moving said section of the loop so that the loop passes on the end of the hook with the end of the hook passing through the other end of the opening of the loop, and releasing said section of the loop on the outboard section of the hook.

34. A method according to claim 33 wherein the loop has a handle connected to it and wherein, in performing the method, the loop is stretched and said section of the loop is moved as set forth therein by pulling and moving the handle, the handle being connected to the loop at said pulled and moved section of the loop.

35. A method for providing for an improvement in the ease of removing a loop from the position of retaining a hook in connection with a linear member which results from accomplishment of the method of claim 33, wherein such improvement is provided, at least in part, by providing for the avoidance of the entanglement of the loop in the hook and the linear member during such removal, said method in this claim comprising only the step of providing the loop with a graspable manipulatable appendage which is connected to the loop at said pulled and moved section of the loop, whereby said section of the loop will be positively identified and provided with ready removal means to avoid entanglement by ensuring that that section of the loop can be removed first from the end of the hook and to facilitate its removal from the end of the hook.

36. A method for providing means for avoiding entanglement of a loop in a hook and a linear member when removing the loop from a hereinafter described position of connecting and retaining the hook to the linear member, said position of connecting and retaining the hook being that in which, with the hook hooked to the linear member in the normal manner, the hook passes through one end of the loop opening at a first location on the hook which is outboard of the position occupied by the linear member, and the loop substantially and effectively lies on a path which extends from said first outboard location on the hook, extending past a position occupied by the undersurface of the linear member, to a second location on the hook which is inboard of the position occupied by the linear member with both strips of loop material, which extend from said first outboard location on the hook, passing to one side of and over and around the outside of and around to the other side of the hook at said inboard location on the hook, thence the loop path extends therefrom, extending past a position occupied by the undersurface of the linear member, to a final location on the hook which is outboard of the position occupied by the linear member and so that the hook passes through the other end of the loop opening at said final outboard location on the hook, said final outboard location on the hook generally being near to said first outboard location on the hook, the method in this claim comprising only the step of providing the loop with a graspable manipulatable appendage which is connected to one section of the loop, said section of the loop being that section at the end of the loop opening which is last placed on an outboard location on the hook during installation of the loop in its connecting and retaining position, whereby said section of the loop is provided with ready removal means which positively identifies said last-placed end of the loop opening to ensure that that section of the loop and end of the loop opening can be removed first from the end of the hook during removal of the loop from its connecting and retaining position and thereby avoid entanglement of the loop in the hook and the linear member.

37. The method of claim 36 for providing means for avoiding entanglement of a loop in a hook and a linear member when removing the loop from the therein described position of connecting and retaining the hook to the linear member, wherein there are further limitations on the conditions under which the hook is connected and retained to the linear member by the loop, such limitations being, first, that, in said described position of the loop in connecting and retaining the hook to the linear member, at least one of the two mentioned locations of the loop on the hook, which are outboard of the position occupied by the linear member, is at a substantially inwardly inclined location on the hook, and the mentioned location of the loop on the hook, which is inboard of the position occupied by the linear member, is at a substantially inwardly inclined location on the hook, and the second limitation is that the hook is of such size and shape with respect to the diameter or thickness of the linear member that the linear member is comparatively thin with respect to the size and shape of the hook to such degree that the loop can be installed on the hook at substantially inwardly inclined locations on the hook which are outboard and inboard, respectively, of the position occupied by the linear member, whereby the method for providing means for avoiding entanglement of the loop in the hook and the linear member when removing the loop from its position of connecting and retaining the hook to the linear member applies to a situation in which the hook is positively and forcefully fastened to the linear member by the loop due to the loop being positioned on substantially inwardly inclined locations on the hook.

* * * * *